(12) United States Patent
Yunusov et al.

(10) Patent No.: US 12,063,096 B2
(45) Date of Patent: Aug. 13, 2024

(54) HYBRID FREQUENCY REPEATER FOR A MULTIPLE HOP LINK

(71) Applicant: QUALCOMM Incorporated, San Diego, CA (US)

(72) Inventors: David Yunusov, Holon (IL); Michael Levitsky, Rehovot (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/050,162

(22) Filed: Oct. 27, 2022

(65) Prior Publication Data
US 2024/0146393 A1  May 2, 2024

(51) Int. Cl.
*H04B 7/0413* (2017.01)
*H04B 7/155* (2006.01)

(52) U.S. Cl.
CPC ....... *H04B 7/15528* (2013.01); *H04B 7/0413* (2013.01)

(58) Field of Classification Search
CPC .......................... H04B 7/15528; H04B 7/0413
See application file for complete search history.

(56) References Cited

U.S. PATENT DOCUMENTS

| | | | |
|---|---|---|---|
| 2010/0284446 A1 | 11/2010 | Mu et al. | |
| 2019/0191419 A1 | 6/2019 | Liu et al. | |
| 2020/0403689 A1* | 12/2020 | Rofougaran | ........ H04W 52/245 |
| 2022/0263566 A1 | 8/2022 | Mehrabani | |

OTHER PUBLICATIONS

International Search Report and Written Opinion—PCT/US2023/075247—ISA/EPO—Feb. 8, 2024.

* cited by examiner

*Primary Examiner* — Rahel Guarino
(74) *Attorney, Agent, or Firm* — Harrity & Harrity, LLP

(57) ABSTRACT

Various aspects of the present disclosure generally relate to wireless communication. In some aspects, a repeater may receive, via a first frequency band, a first one or more signals of a communication that is associated with a multiple hop link, wherein the first one or more signals are associated with a first one or more communication parameters that result in a data capacity for the first one or more signals. The repeater may perform an action to adjust the first one or more communication parameters to a second one or more communication parameters for transmission via a second frequency band, the second one or more communication parameters causing the data capacity to be maintained. The repeater may transmit, via the second frequency band, a second one or more signals of the communication using the second one or more communication parameters. Numerous other aspects are described.

30 Claims, 10 Drawing Sheets

HYBRID FREQUENCY REPEATER FOR A MULTIPLE HOP LINK

FIELD OF THE DISCLOSURE

Aspects of the present disclosure generally relate to wireless communication and to techniques and apparatuses associated with a hybrid frequency repeater for a multiple hop link.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a repeater for wireless communication. The repeater may include a memory and one or more processors coupled to the memory. The one or more processors may be configured to receive, via a first frequency band, a first one or more signals of a communication that is associated with a multiple hop link, wherein the first one or more signals are associated with a first one or more communication parameters that result in a data capacity for the first one or more signals. The one or more processors may be configured to perform an action to adjust the first one or more communication parameters to a second one or more communication parameters for transmission via a second frequency band, wherein the second one or more communication parameters cause the data capacity to be maintained. The one or more processors may be configured to transmit, via the second frequency band and via the multiple hop link, a second one or more signals of the communication using the second one or more communication parameters.

Some aspects described herein relate to a method of wireless communication performed by a repeater. The method may include receiving, via a first frequency band, a first one or more signals of a communication that is associated with a multiple hop link, wherein the first one or more signals are associated with a first one or more communication parameters that result in a data capacity for the first one or more signals. The method may include performing an action to adjust the first one or more communication parameters to a second one or more communication parameters for transmission via a second frequency band, wherein the second one or more communication parameters cause the data capacity to be maintained. The method may include transmitting, via the second frequency band and via the multiple hop link, a second one or more signals of the communication using the second one or more communication parameters.

Some aspects described herein relate to a non-transitory computer-readable medium that stores a set of instructions for wireless communication by a repeater. The set of instructions, when executed by one or more processors of the repeater, may cause the repeater to receive, via a first frequency band, a first one or more signals of a communication that is associated with a multiple hop link, wherein the first one or more signals are associated with a first one or more communication parameters that result in a data capacity for the first one or more signals. The set of instructions, when executed by one or more processors of the repeater, may cause the repeater to perform an action to adjust the first one or more communication parameters to a second one or more communication parameters for transmission via a second frequency band, wherein the second one or more communication parameters cause the data capacity to be maintained. The set of instructions, when executed by one or more processors of the repeater, may cause the repeater to transmit, via the second frequency band and via the multiple hop link, a second one or more signals of the communication using the second one or more communication parameters.

Some aspects described herein relate to an apparatus for wireless communication. The apparatus may include means for receiving, via a first frequency band, a first one or more signals of a communication that is associated with a multiple hop link, wherein the first one or more signals are associated with a first one or more communication parameters that result in a data capacity for the first one or more signals. The apparatus may include means for performing an action to adjust the first one or more communication parameters to a second one or more communication parameters for transmission via a second frequency band, wherein the second one or more communication parameters cause the data capacity to be maintained. The apparatus may include means for transmitting, via the second frequency band and via the multiple hop link, a second one or more signals of the communication using the second one or more communication parameters.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
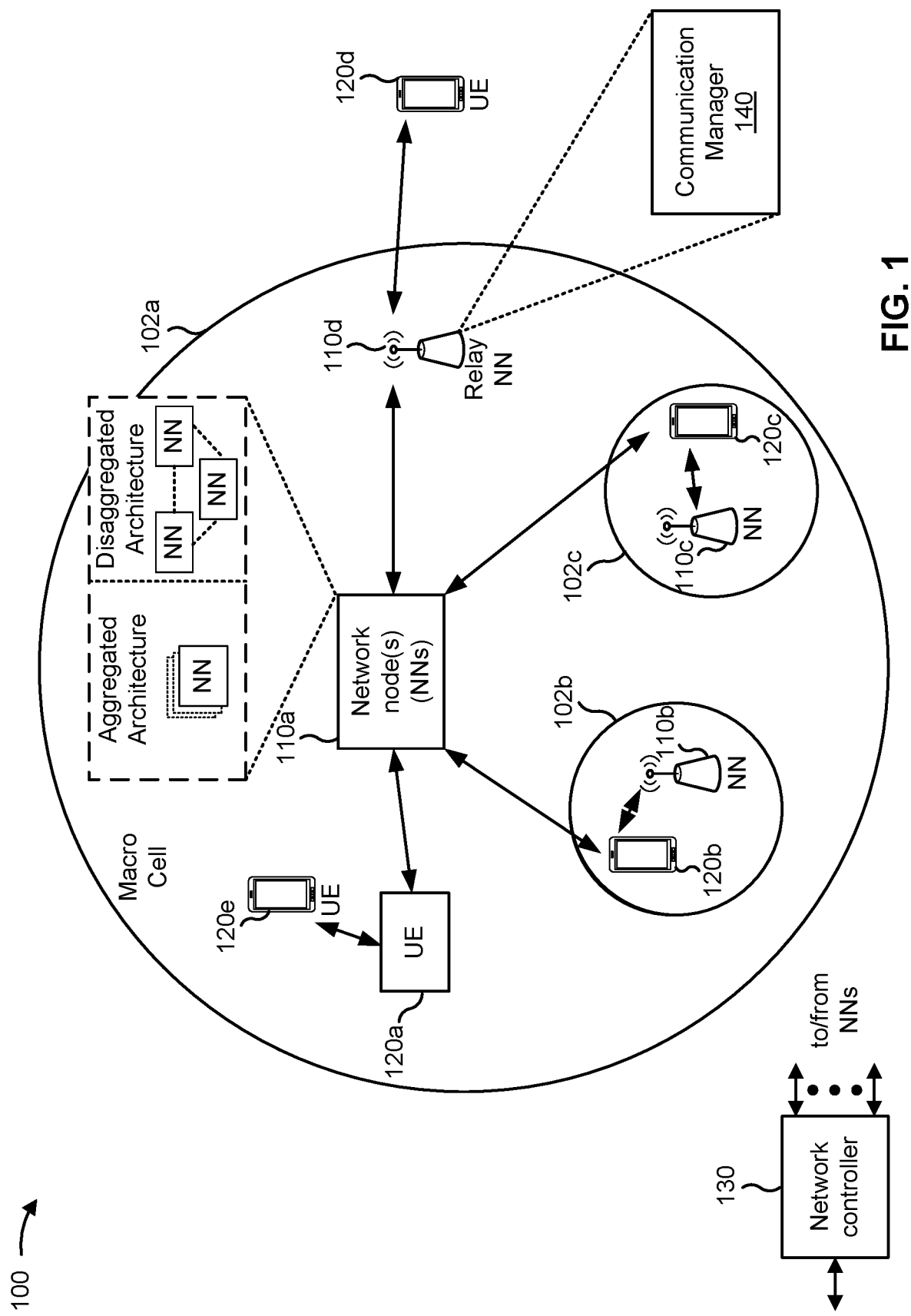
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network, a 4G (e.g., Long Term Evolution (LTE)) network, and/or a network subsequent to 5G (e.g., 6G), among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like. A relay station may also be referred to as a repeater herein.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band. In some examples, the higher frequency bands may include a sub-terahertz (sub-THz) frequency band. The sub-THz frequency band may include frequencies included in the FR4a, FR4-1, FR4, FR5, or higher frequencies. For example, the sub-THz frequency band may include frequencies greater than 100 GHz. In some cases, the sub-THz frequency band may include frequencies in the range of 90 GHz-300 GHz.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a repeater (e.g., a relay station) may include a communication manager 140. As described in more detail elsewhere herein, the communication manager 140 may receive, via a first frequency band, a first one or more signals of a communication that is associated with a multiple hop link, wherein the first one or more signals are associated with a first one or more communication parameters that result in a data capacity for the first one or more signals; perform an action to adjust the first one or more communication parameters to a second one or more communication parameters for transmission via a second frequency band, wherein the second one or more communication parameters cause the data capacity to be maintained; and transmit, via the second frequency band and via the multiple hop link, a second one or more signals of the communication using the second one or more communication parameters. Additionally, or alternatively, the communication manager 140 may perform one or more other operations described herein.

As indicated above, FIG. 1 is provided as an example. Other examples may differ from what is described with regard to FIG. 1.

Figure 2:
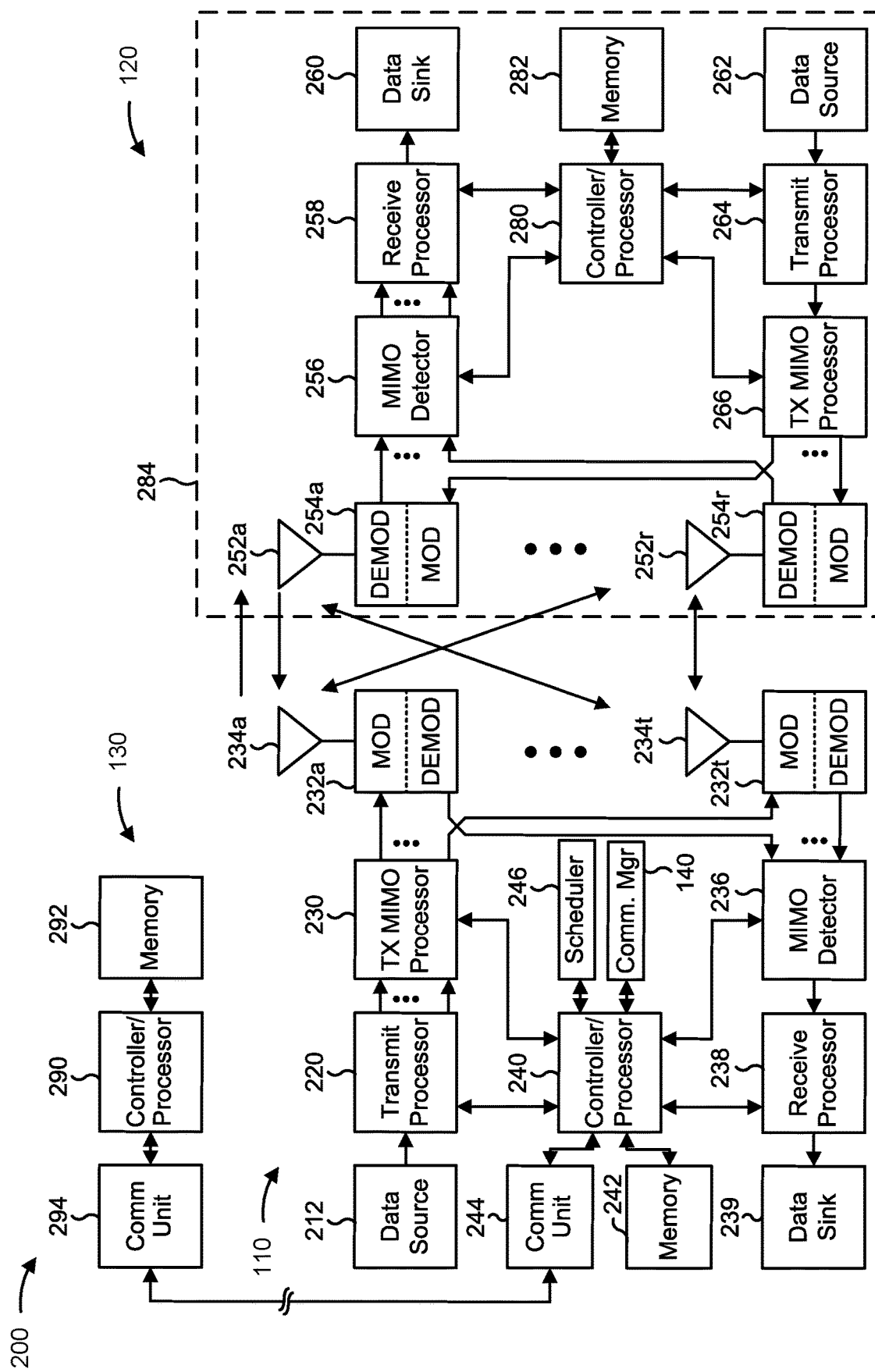
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the network node 110, the controller/processor 280 of the UE 120, and/or any other component(s) of FIG. 2 may perform one or more techniques associated with a hybrid frequency repeater for a multiple hop link, as described in more detail elsewhere herein. In some aspects, the repeater described herein is the network node 110, is included in the network node 110, or includes one or more components of the network node 110 shown in FIG. 2. Additionally, or alternatively, the repeater described herein may be the UE 120, may be included in the UE 120, or may include one or more components of the UE 120 shown in FIG. 2

Figure 9:
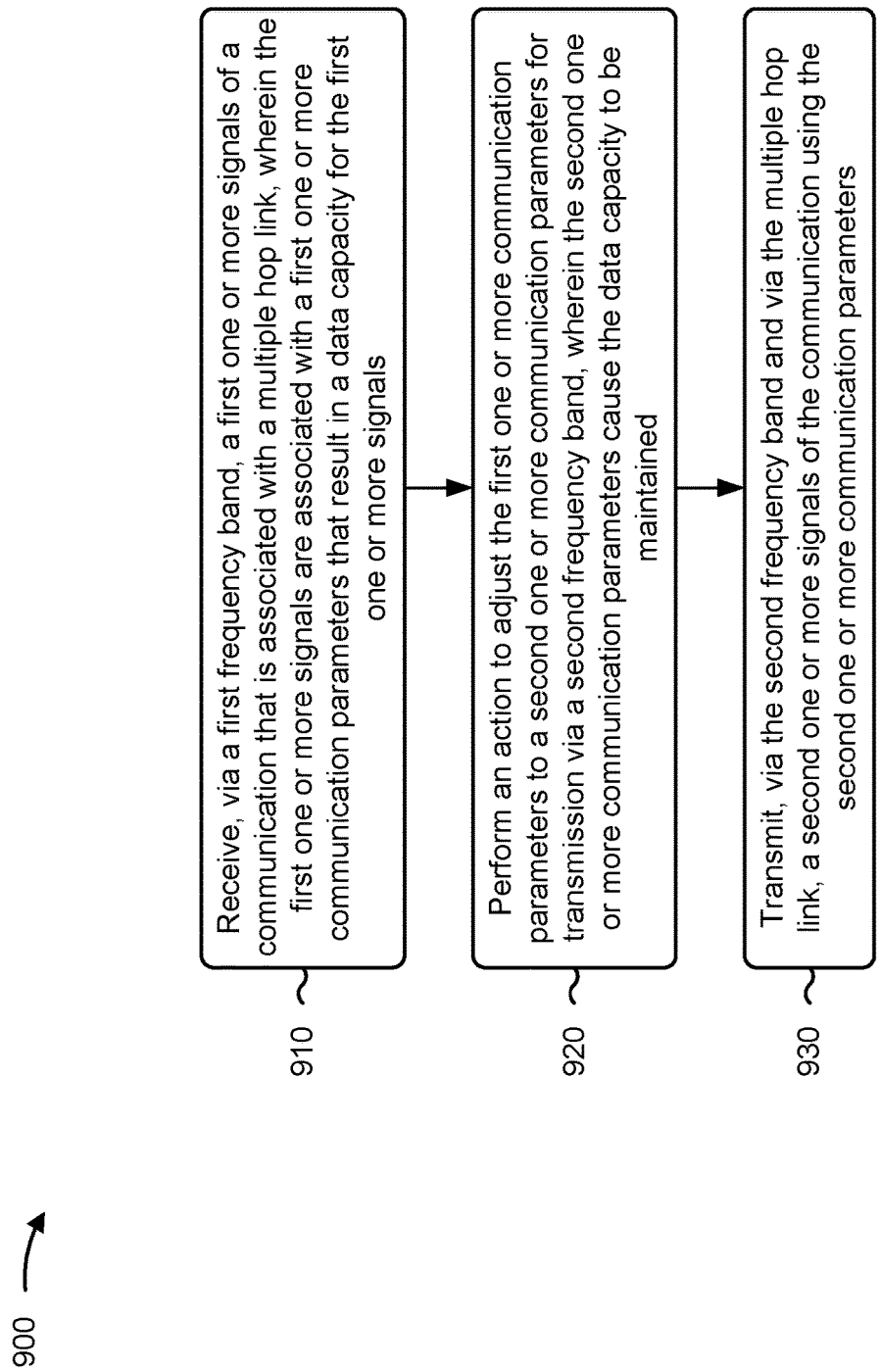
FIG. 9 is a diagram illustrating an example process performed, for example, by a repeater, in accordance with the present disclosure.

For example, the controller/processor 240 of the network node 110, the controller/processor 280 of the UE 120, and/or any other component(s) of FIG. 2 may perform or direct operations of, for example, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, and/or other processes as described herein. In some examples, executing instructions may include running the instructions, converting the instructions, compiling the instructions, and/or interpreting the instructions, among other examples.

In some aspects, a repeater includes means for receiving, via a first frequency band, a first one or more signals of a communication that is associated with a multiple hop link, wherein the first one or more signals are associated with a first one or more communication parameters that result in a data capacity for the first one or more signals; means for performing an action to adjust the first one or more communication parameters to a second one or more communication parameters for transmission via a second frequency band, wherein the second one or more communication parameters cause the data capacity to be maintained; and/or means for transmitting, via the second frequency band and via the multiple hop link, a second one or more signals of the communication using the second one or more communication parameters. In some aspects, the means for the repeater to perform operations described herein may include, for example, one or more of communication manager 140, transmit processor 220, TX MIMO processor 230, modem 232, antenna 234, MIMO detector 236, receive processor 238, controller/processor 240, memory 242, or scheduler 246. In some other aspects, the means for the repeater to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
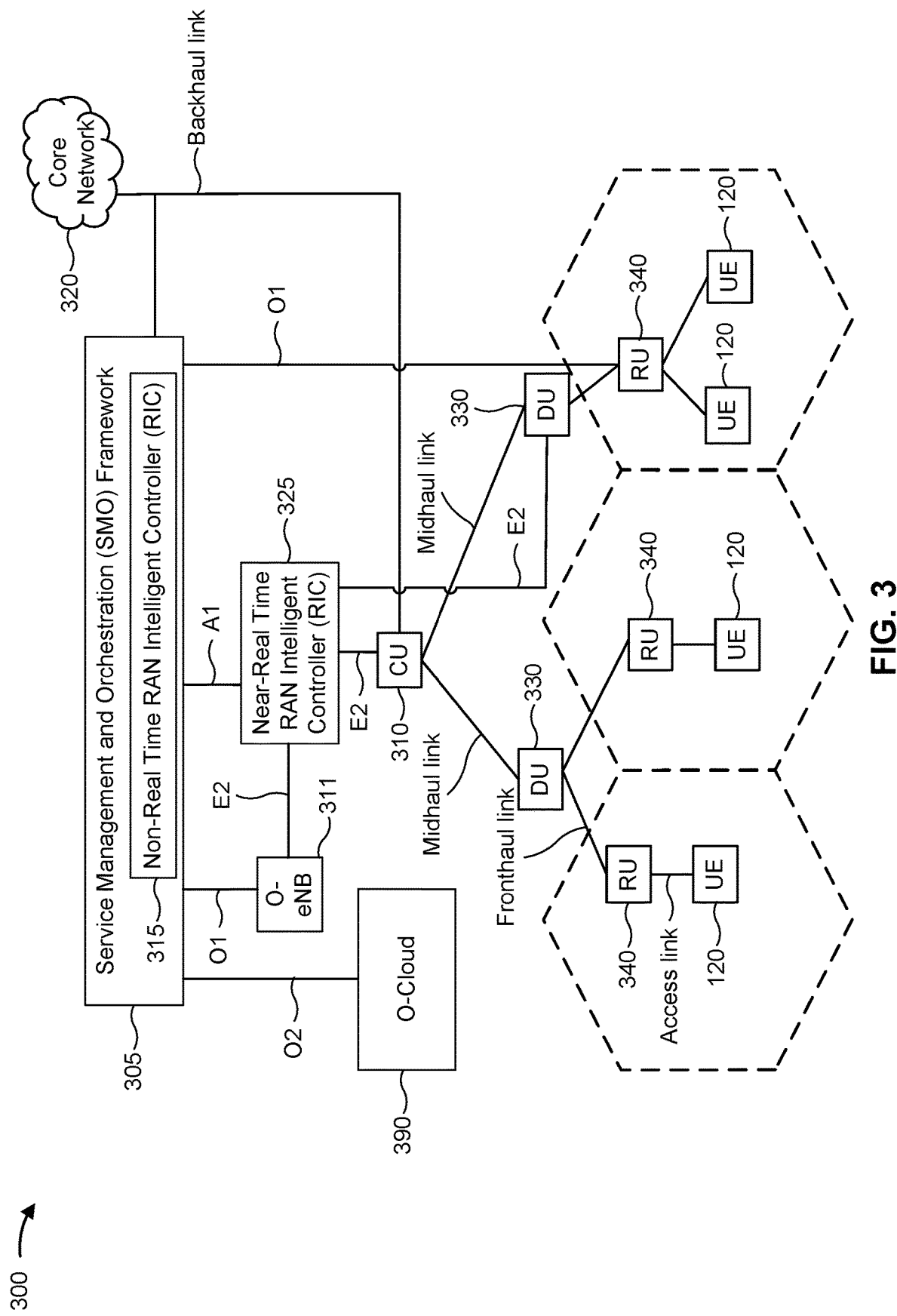
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
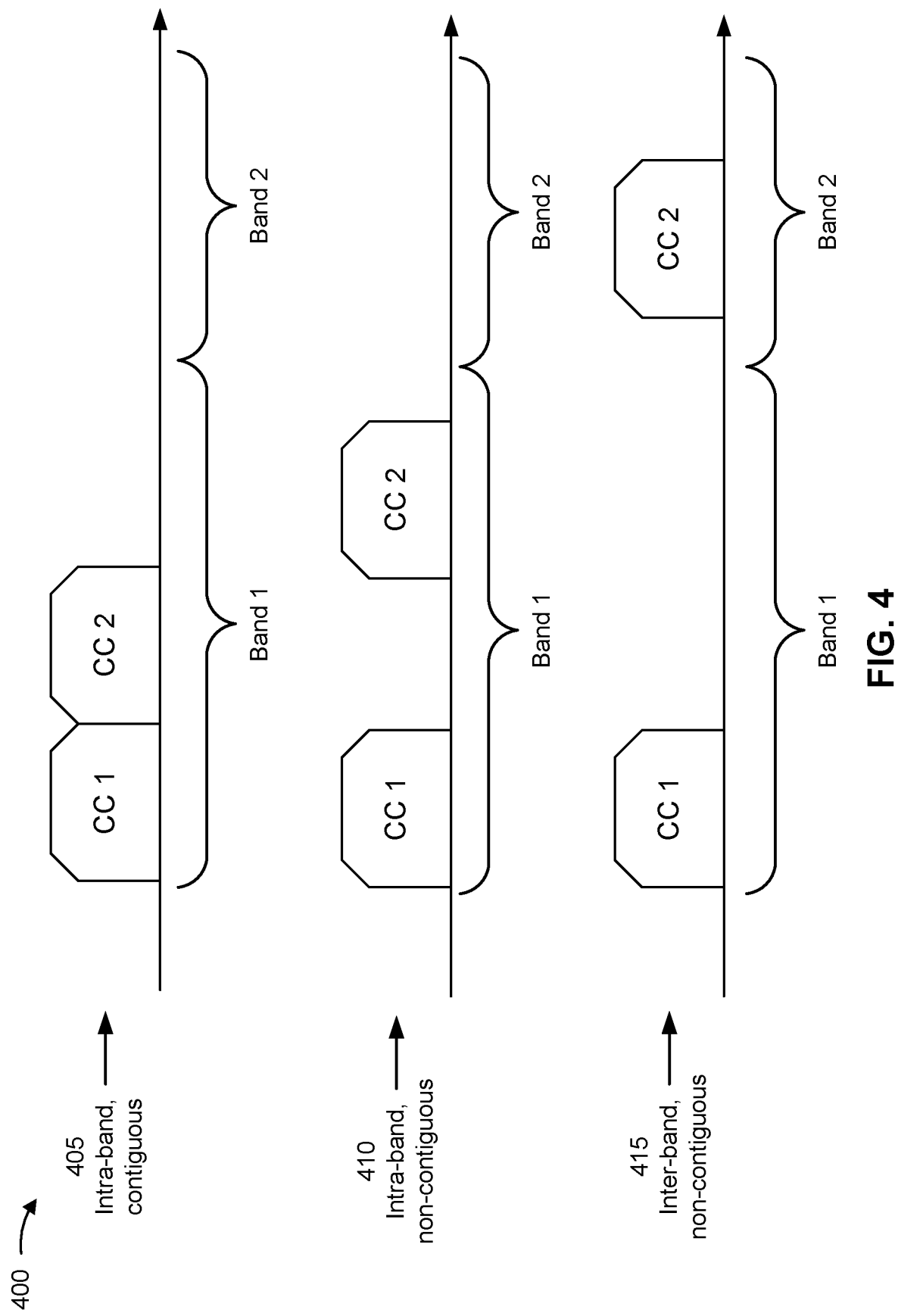
FIG. 4 is a diagram illustrating examples of carrier aggregation, in accordance with the present disclosure.

FIG. 4 is a diagram illustrating examples 400 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A network node 110 may configure carrier aggregation for a UE 120, such as in an RRC message, downlink control information (DCI), and/or another signaling message.

As shown by reference number 405, in some aspects, carrier aggregation may be configured in an intra-band contiguous mode where the aggregated carriers are contiguous to one another and are in the same band. As shown by reference number 410, in some aspects, carrier aggregation may be configured in an intra-band non-contiguous mode where the aggregated carriers are non-contiguous to one another and are in the same band. As shown by reference number 415, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

In some examples, for inter-band carrier aggregation, a primary cell may be associated with a first frequency band and a secondary cell may be associated with a second frequency band, where the first frequency band is associated with a lower frequency than the second frequency band. For example, the primary cell may be associated with an FR1 band, an FR2 band, or an FR4 band, among other examples, and the secondary cell may be associated with a sub-THz band. In some examples, due to a reduced coverage area of the secondary cell (e.g., caused by using the higher frequency band), the UE may rely on a connection with the primary cell to obtain information associated with the secondary cell. For example, a secondary cell deployment may rely on primary cell connectivity to support a power efficient sub-THz deployment with a burst activity pattern on the secondary cell. In some examples, the secondary cell (e.g., the sub-THz cell) may be collocated with the primary cell (e.g., the primary cell and the secondary cell may be associated with the same network node or network nodes that are collocated). In other examples, the secondary cell may not be collocated with the primary cell.

As indicated above, FIG. 4 is provided as an example. Other examples may differ from what is described with regard to FIG. 4.

In some network deployments, cells may be deployed that operate using high frequency bands, such as the EHF band, FR3, FR4, FR5, a sub-THz band (e.g., which may include frequencies that are multiple hundreds of GHz, such as 100 GHz-300 GHz), and/or other high frequency bands. The cells operating using high frequency bands may be referred to herein as "high-band cells." The high-band cells may provide increased data capacity and/or increased throughput for UEs (e.g., because of an increased bandwidth associated with the high frequency bands). For example, a UE 120 and a network node 110 associated with a high-band cell may communicate using a larger bandwidth size, such as a 7.5 GHz bandwidth, among other examples. Communicating using the larger bandwidth size may result in an increased throughput for communications between the UE 120 and the network node 110.

RF constraints and propagation properties that are unique to the high frequency bands may introduce new design challenges for wireless networks. For example, the high frequency bands may be associated with a high path loss. Therefore, to compensate for the high path loss, the network node 110 and the UE 120 may communicate using narrow beams (for example, beams with a narrow beam width or signals with energy concentrated over a narrow directional range). In such examples, spatial division multiplexing (SDM) may be used (for example, where different, spatially separable antenna beams are formed for different UEs). However, the narrow beams may be suspectable to beam blockage, interference, or other intervening factors that degrade performance of signals communicated via the narrow beams. Therefore, high-band cells may be associated with a smaller coverage area (e.g., a geographic area associated with a cell) as compared to cells using a lower operating frequency (e.g., which may be referred to herein as "low-band cells"). Because of the smaller coverage area of high-band cells, in some network deployments, high-band cells may be more densely distributed in the wireless network as compared to low-band cells. For example, multiple high-band network nodes (e.g., multiple RUs) may be deployed within a coverage area of a single low-band network node (e.g., within a coverage area of a low-band cell).

Additionally, high frequency (e.g., sub-THz) operations may be associated with a decreased efficiency of a power amplifier of the UE or network node. For example, a power amplifier power may decrease as a function of frequency and as a function of bandwidth. Therefore, high frequency (e.g., sub-THz) operations may be associated lower power amplifier power and lower power amplifier efficiency. This may result in a reduced effective isotropic radiated power (EIRP) that a device is capable of producing, resulting in the reduced coverage for high-band cells. As another example, high frequency (e.g., sub-THz) operations may be associated with increased power consumption. For example, high frequency (e.g., sub-THz) operations may be associated with a larger bandwidth (e.g., due to a larger subcarrier spacing) and high data rates. The larger bandwidth, coupled with less power efficient RF processing, increased sampling rates (e.g., for an analog-to-digital converter or a digital-to-analog converter), increased digital processing rates, increased bit rates, and/or increased storage or memory requirements, among other examples, may increase power consumption of wireless communication devices using the high frequency bands, such as the sub-THz band.

The poor coverage, increased power consumption, and narrow beams associated with high-band cells (e.g., sub-THz cells or other high-band cells) may introduce challenges for beam management. For example, as operational frequencies increase from mmW frequency ranges to sub-THz frequency ranges, beam widths may decrease (e.g., linearly) while a quantity of beams may increase (e.g., quadratically). In other words, to support high frequency band operations, such as sub-THz operations, a quantity of antenna elements in an antenna panel may be increased (e.g., to support forming an increased quantity of beams and/or narrower beams). For example, when increasing from an operating frequency of 28 GHz to 140 GHz, a ⅕ beam width reduction may result in 25 times (e.g., ×25) more beams for the same array area (e.g., for the same antenna panel). With such a large quantity of beams available, a signaling overhead associated with beam management procedures may be increased (e.g., due to a UE and/or a network node having to scan or sweep over a large quantity of narrow beams, in a similar manner as described above in connection with FIG. 7). Additionally, the increased quantity of beams may introduce latency associated with performing beam management procedures via the increased quantity of beams. Further, because the high frequency operations may be associated with an increased power consumption, performing beam management over the increased quantity of beams may consume significant power resources of wireless communication devices.

Figure 5:
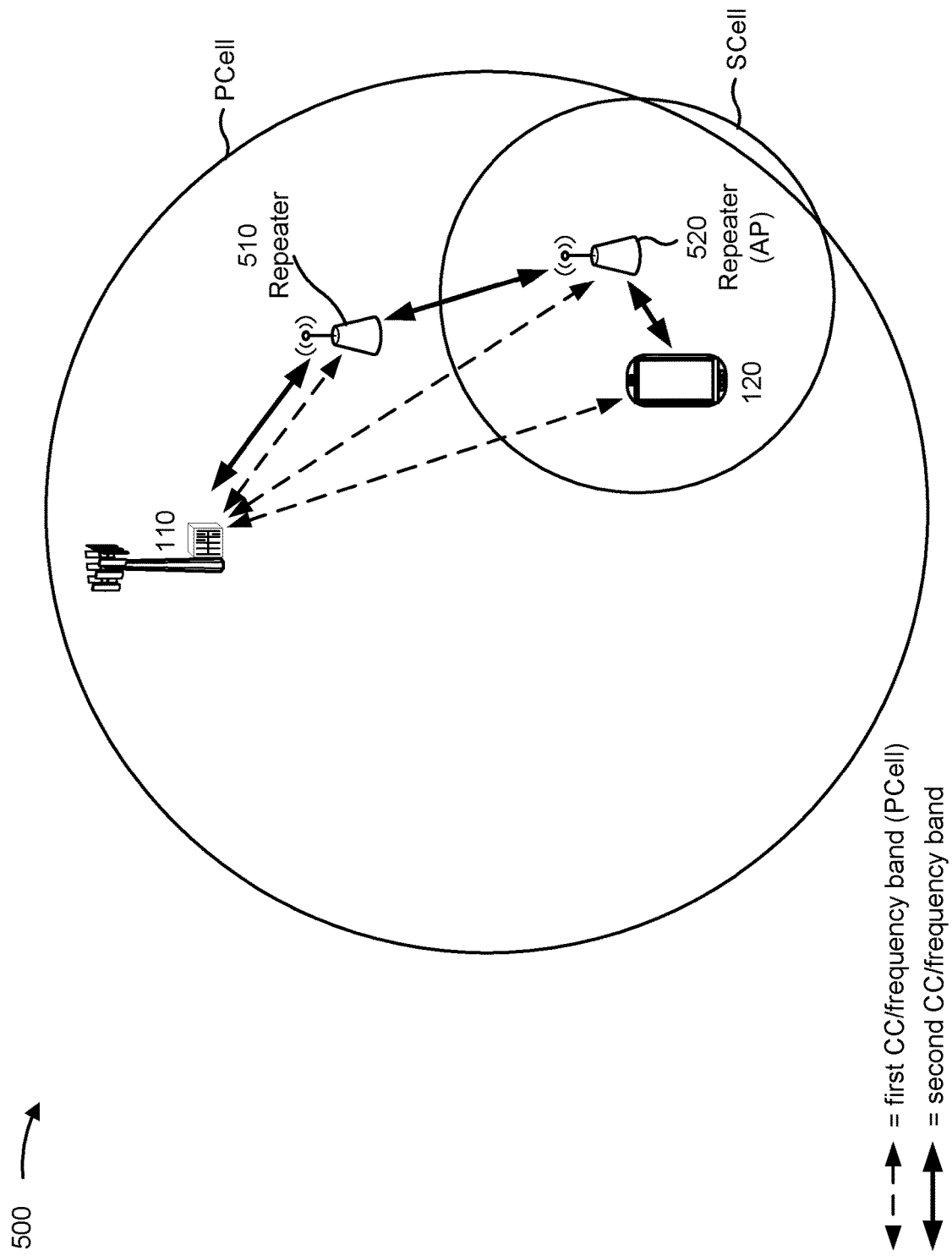
FIG. 5 is a diagram illustrating example of a network deployment, in accordance with the present disclosure.

FIG. 5 is a diagram illustrating example 500 of a network deployment, in accordance with the present disclosure. In some examples, the network deployment depicted in FIG. 5 may support sub-THz communications. For example, the network deployment may utilize APs (also referred to herein as repeaters) in areas with high data volume demand potential. In some examples, the APs may provide a high capacity channel for sub-THz eligible (e.g., supporting sub-THz communication and satisfying a list of preconditions) UEs registered and continuously connected to a lower frequency band primary cell or "master" cell (e.g., FR1/FR2 based cell such as a PCell an SCell on a lower frequency band compared to sub-THz band). The APs may provide a local spot-based coverage with increased capacity under a wider PCell (e.g., FR1 based PCell) or a lower frequency band SCell (e.g., FR2 based SCell) coverage range.

The sub-THz communication may be a supplementary high capacity channel that may be deployed as a secondary cell with burst activity pattern for sparse usage in time for sub-THz eligible UEs. The sub-THz eligible UE may be continuously connected to the PCell via the lower frequency band (e.g., FR1/FR2/FR4) as one of the prerequisites for a more power efficient spot based sub-THz deployment that may rely on inter-band carrier aggregation. As used herein, "primary cell," "PCell," or "master cell" may be used interchangeably and may refer to a lower frequency band cell where initial connection between the sub-THz eligible UE and network node is established and continuously maintained, while this continuous connection is used as a reference for coarse synchronization and beam management procedures for a higher frequency band based SCell (e.g., a sub-THz based SCell) and is also used for all the registration and any control plane signaling for the sub-THz based SCell.

As used herein, "secondary cell" or "SCell" may refer to a non-primary cell. Correspondingly, a sub-THz based SCell may support a minimum scope of critical functionality and may rely on PCell connectivity in many aspects (e.g., sub-THz related control signaling, coarse synchronization and coarse beam management supporting a dynamic low latency and low power and low complexity activation/deactivation procedures). A Sub-THz based SCell may enable a spot-based coverage under a lower band PCell coverage range and may be used for a significant volume data offloading using a relatively short data offloading sessions for sub-THz eligible UEs (with preconditions).

As shown in FIG. 5, the network deployment may include a network node 110 that supports a PCell. The network deployment may include a repeater 510. The repeater 510 may be referred to as a rendezvous point (RP). An SCell may be supported by a repeater 520. The repeater 520 may be referred to as an AP. For example, the repeater 520 may enable the UE 120 to communicate via a sub-THz frequency band, as described in more detail herein.

As shown in FIG. 5, inter-band carrier aggregation may be used where a sub-THz frequency band is used on the SCell providing a spot based sub-THz coverage under a wider PCell coverage range and the PCell may use a lower frequency band (e.g., FR1/FR2/FR4). The Sub-THz SCell may support a scope of functionality and may rely on PCell/lower frequency band cell for wireless communication functionality. For example, the SCell may not support any "always on" signals or resources reservation (e.g., signal that are always present on the sub-THz SCell such as synchronization signal blocks (SSBs), random access channel (RACH) occasion signaling, periodic reference signals, and/or control signaling).

In some examples, the SCell may be activated dynamically on demand (e.g., for sporadic and short time sessions, that may have a burst activity pattern). Coarse synchronization and beam management for SCell/sub-THz may be determined based on the PCell. There may be a complementary synchronization and beam refinement procedures carried out at each activation of the SCell, and the SCell synchronization and beam management (BM) may be at least partially based on the PCell. As shown in FIG. 5, there may be single or multi-hop repeating (e.g., enabled by the repeater 510 and the repeater 520 to the UE 120) between sub-THz UE and sub-THz network node (e.g., the network node 110) transceiver to bridge over a limited sub-THz range. In some examples, the multi-hop repeating may be associated with difference frequency bands on different hops (e.g., a first hop may use a first frequency band, a second hop may use a second frequency band, and a third hop may use a third frequency band (or the first frequency band).

The repeaters (such as the repeater 510 and the repeater 520) may be efficient smart repeaters with out-of-band (OOB) control based on PCell connectivity of all the sub-THz link components (e.g., UEs, APs or intermediate repeaters in case of multi hop sub-THz links). The repeaters may include different functional components such as (1) a reduced capability (RedCap) UE (RC UE) for PCell connectivity (e.g., to deliver OOB control/reports/feedbacks), (2) an analog amplify and forward (AF) functionality for sub-THz data forwarding, and/or (3) dedicated component for sub-THz local complementary synchronization and beam management sessions using a dedicated synchronization and beam management reference signal (or modified waveform localized in time SSB mini-bursts) transmit (Tx) and/or receive (Rx) capability over the sub-THz on SCell, among other examples. Multi hop sub-THz links may be established and/or activated and synchronized using progressive synchronization across hops with hop specific synchronization and beam management sessions with customized synchronization and beam management reference signal mini-burst scheduling (by a network node over the PCell) for transmission and reception from a first sub-THz hop edge (Tx side) to a corresponding second sub-THz hop edge (Rx side to sync on the Tx side).

In some examples, sub-THz communication may be supported in a non-standalone fashion as an SCell (or secondary component carrier) while the corresponding PCell (or primary component carrier) may be on a lower frequency range (e.g., FR1/FR2/FR4) and may serve as master cell connectivity to support the sub-THz communication (which may be with a burst activity pattern).

As used herein, the term "repeater" may refer to a network controlled repeater (e.g., which may be an AP for direct connection with UEs, an RP for intermediate or direct link with network node, such as network node, or a mixed type that combines functionality of AP and RP) that may receive a transmission, and perform network controlled amplify and forward to transmit the transmission to a UE, a network node, or another repeater. As used herein, the term "sub-THz repeater" may refer to a repeater for amplifying and forwarding sub-THz communications (e.g., control information for a sub-THz repeater may be on a different frequency band). In some examples, the repeater may be an analog repeater (e.g., a repeater that does not perform digital processing of signals). In some examples, a repeater may be a UE, a network node, and/or an RU, among other examples.

For sub-THz communications, in order to achieve a denser sub-THz coverage, a denser geographical distribution of sub-THz transceivers may be used. If each sub-THz coverage spot is associated with a sub-THz network node or cell (with a direct links to sub-THz eligible UEs), full digital demodulation and decoding procedures of sub-THz signals may be done locally for each spot before backhauling the integrated and remodulated data to a PCell network node. Given a high quantity of sub-THz transceivers that may be used to cover PCell coverage range, the power consumption may be large. Aspects provided herein provide mechanisms for enabling multi-hop (e.g., enabled by multiple repeaters) sub-THz deployment to increase the supported spot-based sub-THz coverage range/coverage density with a small power consumption or energy investment to allow a more power efficient sub-THz deployment. In order to improve network energy efficiency characteristics for sub-THz deployment, aspects provided herein may enable an extended range multi-hop sub-THz links based on repeaters with analog sub-THz signal processing (AP/RP) (e.g., amplify and forward analog processing) allowing a non-direct UE to sub-THz network node connection to be employed instead of a more power-hungry approach based on multiple sub-THz small cells. For example, a repeater (e.g., an analog repeater) may operate using analog processing and relay signals in the analog domain (e.g., the repeater may not perform operations in the digital domain, thereby conserving processing resources and power resources).

However, a repeater that uses analog sub-THz signal processing (e.g., a repeater that does not perform one or more digital processing operations, such as analog to digital conversion or digital to analog conversion) may experience noise or interference caused by Tx-to-Rx leakage. For example, Tx-to-Rx leakage may refer to Rx components (e.g., an Rx antenna element) of a repeater receiving a signal that is transmitted via a Tx component (e.g., a Tx antenna element) of the repeater (e.g., the same repeater). For example, because Rx elements and Tx elements of the repeater may use the same, or similar, operating frequency, the repeater may experience degraded performance caused by Tx-to-Rx leakage. To mitigate negative effects caused by the Tx-to-Rx leakage, a maximum transmit power of the repeater may be limited. As a result, a range of a link between two repeaters (e.g., the repeater 510 and the repeater 520) and/or a range of a coverage area of the SCell may be reduced. This may reduce a range or coverage area for sub-THz communications using the network deployment depicted in FIG. 5.

Some techniques and apparatuses described herein enable a hybrid frequency repeater for a multi-hop link. For example, a repeater may receive, via a first frequency band, a first one or more signals of a communication that is associated with a multiple hop link. The repeater may transmit, via a second frequency band, a second one or more signals of the communication. In other words, the repeater may use different frequencies and/or different frequencies bands for a repeating operation associated with a multi-hop link network deployment (such as the network deployment depicted in FIG. 5).

In some aspects, the repeater may perform one or more operations to ensure a data capacity of received signals and transmitted signals is the same or similar. For example, a first frequency band used for a receiving operation by the repeater and a second frequency band used by the repeater for a transmitting operation may be associated with different supported bandwidths. For example, the first one or more signals may be associated with a first one or more communication parameters that result in a data capacity for the first one or more signals. The repeater may perform an action to adjust the first one or more communication parameters to a second one or more communication parameters for transmission via the second frequency band, where the second one or more communication parameters cause the data capacity to be maintained (e.g., to be the same or within a threshold). The repeater may transmit, via the second frequency band and via the multiple hop link, a second one or more signals of the communication using the second one or more communication parameters. Therefore, the repeater may maintain a data capacity of communications between a receiving operation and a transmitting operation.

As a result, the repeater may mitigate noise or interference caused by Tx-to-Rx leakage. For example, different carrier frequencies may be used on different sides of an analog repeater (Tx and Rx) to increase Tx to Rx isolation based on frequency domain separation. Frequency domain-based separation of Tx and Rx signals on the repeater side allows to avoid nonstable and/or resonating power loops. This may enable the multi-hop link (such as the network deployment depicted in FIG. 5) to use analog repeaters. Using analog repeaters may improve a power efficiency of the repeaters (e.g., as compared to repeaters that perform digital processing). Additionally, by enabling a repeater to use different frequencies and/or different frequencies bands for a repeating operation, a transmit power (e.g., an allowed transmit power) of the repeater may be increased. This may improve a range and/or coverage area of the repeater. By increasing the range and/or coverage area of the repeater, a range and/or coverage area of a sub-THz network deployment (such as the network deployment depicted in FIG. 5) may be increased.

As indicated above, FIG. 5 is provided as an example. Other examples may differ from what is described with regard to FIG. 5.

Figure 6:
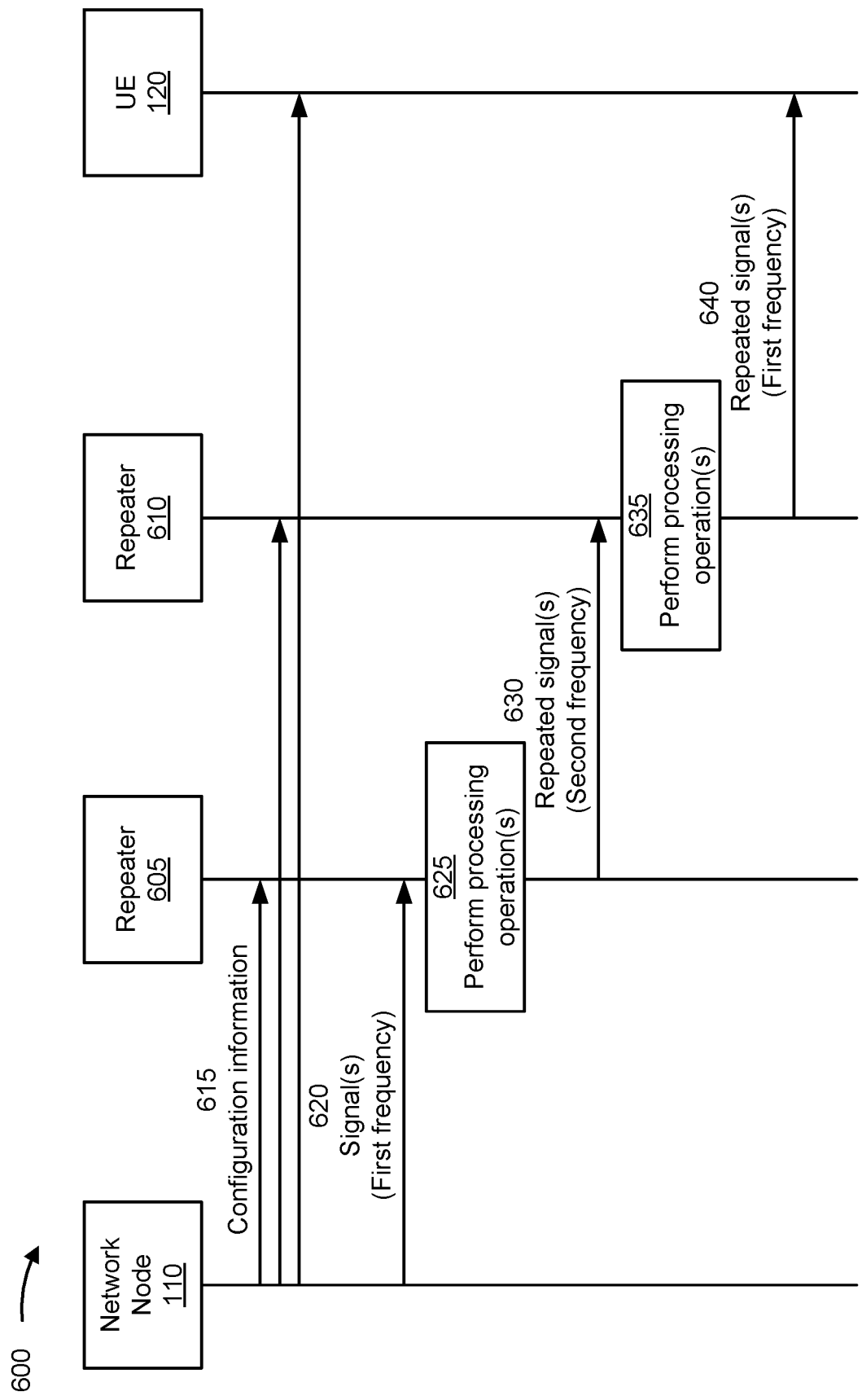
FIGS. 6-8 are diagrams of examples associated with a hybrid frequency repeater for a multi-hop link, in accordance with the present disclosure.

FIG. 6 is a diagram of an example 600 associated with a hybrid frequency repeater for a multi-hop link, in accordance with the present disclosure. As shown in FIG. 6, a network node 110 (e.g., a base station, a CU, a DU, and/or an RU) may communicate with a UE 120 via one or more repeaters, such as a repeater 605 and/or a repeater 610. In some aspects, the network node 110, the repeater 605, the repeater 610, and the UE may be part of a wireless network (e.g., the wireless network 100). The UE 120 and the network node 110 may have established a wireless connection prior to operations shown in FIG. 6.

In some aspects, the network node 110, the repeater 605, the repeater 610, and the UE 120 may be part of a wireless network that uses one or more sub-THz frequency bands for communication. The network node 110, the repeater 605, the repeater 610, and the UE 120 may be part of a network deployment similar to the network deployment depicted in FIG. 5. For example, the network node 110 may be associated with a PCell. The repeater 610 may be associated with an SCell (e.g., a sub-THz SCell). The repeater 610 may be an AP and the repeater 605 may be an RP. In some aspects, the repeater 605 and the repeater 610 may communicate via a line-of-sight (LOS) link or a near LOS link.

The repeater 605 and/or the repeater 610 may be analog repeaters. For example, the repeater 605 and/or the repeater 610 may be any wireless communication device capable of receiving a transmission, performing network controlled amplify and forward to transmit (e.g., to repeat) the transmission to a UE, a network node, and/or another repeater, among other examples. For example, the repeater 605 and/or the repeater 610 may be similar to the repeaters described in connection with FIG. 5.

In some aspects, actions described herein as being performed by a network node 110 may be performed by multiple different network nodes. For example, configuration actions may be performed by a first network node (for example, a CU or a DU), and radio communication actions may be performed by a second network node (for example, a DU or an RU). As used herein, the network node 110 "transmitting" a communication to the UE 120 and/or a repeater may refer to a direct transmission (for example, from the network node 110 to the UE 120 or repeater) or an indirect transmission via one or more other network nodes or devices. For example, if the network node 110 is a DU, an indirect transmission to the UE 120 or repeater may include the DU transmitting a communication to an RU and the RU transmitting the communication to the UE 120 or the repeater. Similarly, the UE 120 or a repeater "transmitting" a communication to the network node 110 may refer to a direct transmission (for example, from the repeater or the UE 120 to the network node 110) or an indirect transmission via one or more other network nodes or devices. For example, if the network node 110 is a DU, an indirect transmission to the network node 110 may include the repeater or the UE 120 transmitting a communication to an RU and the RU transmitting the communication to the DU.

As shown by reference number 615, the network node 110 may transmit, and the repeater 605, the repeater 610, and/or the UE 120 may receive, configuration information. In some aspects, the repeater 605, the repeater 610, and/or the UE 120 may receive the configuration information via one or more of system information signaling, RRC signaling, one or more MAC control elements (MAC-CEs), and/or DCI, among other examples. In some aspects, the configuration information may include an indication of one or more configuration parameters for selection, and/or explicit configuration information, among other examples.

In some aspects, the configuration information may indicate that the UE 120 is to communicate via a given frequency band (e.g., a sub-THz frequency band) using a multi-hop link that includes the repeater 605 and/or the repeater 610. For example, the configuration information may indicate that the repeater 610 is an AP for an SCell that is configured for the UE 120. For example, the configuration information may include a configuration of the SCell. The SCell may be associated with a sub-THz frequency band.

In some aspects, the configuration information may indicate that the repeater 605 and/or the repeater 610 are to use different frequencies for transmitting and receiving operations. For example, the configuration information may indicate that the repeater 605 is to use a first frequency band (e.g., a sub-THz frequency) for communications with the network node 110 and a second frequency band (e.g., associated with a lower frequency than the sub-THz frequency, such as a different sub-THz frequency, a millimeter wave frequency, an FR1 frequency, an FR2 frequency, or another frequency) for communications with a next hop in the multi-hop link (e.g., with the repeater 610). Similarly, the configuration information may indicate that the repeater 610 is to use a first frequency band (e.g., the sub-THz frequency) for communications with the UE 120 and a second frequency band (e.g., associated with a lower frequency than the sub-THz frequency, such as a different sub-THz frequency, a millimeter wave frequency, an FR1 frequency, an FR2 frequency, or another frequency) for communications with a next hop in the multi-hop link (e.g., with the repeater 605 or with the UE 120). In other words, a first hop in the multi-hop link (e.g., between the network 110 and the repeater 605) may be associated with a first frequency band, a second hop in the multi-hop link (e.g., between the repeater 605 and the repeater 610) may be associated with a second frequency band, and a third hop in the multi-hop link (e.g., between the repeater 610 and the UE 120) may be associated with a third frequency band or the first frequency band.

In some aspects, the configuration information may indicate one or more communication parameters to be used for communications between the repeater 605 and the repeater 610. For example, the configuration information may include an indication of a first one or more communication parameters (e.g., to be used by a repeater for Rx operations) and/or a second one or more communication parameters (e.g., to be used by a repeater for Tx operations). For example, the configuration information may indicate a quantity of MIMO layers to be used for communications between the repeater 605 and the repeater 610. As another example, the configuration information may indicate a bandwidth to be used for communications between the repeater 605 and the repeater 610. As another example, the configuration information may indicate an MCS to be used for communications between the repeater 605 and the repeater 610.

For example, depending on an occupied bandwidth on Sub-THz based direct links with a Sub-THz eligible UEs, a different quantity of MIMO layers can be dynamically activated by the network node 110 for the repeater 605 and/or the repeater 610 (e.g., for communications between the repeater 605 and the repeater 610). For example, different quantities of MIMO layers can be activated to enable the multi-hop link to maintain a data capacity at different hops within the multi-hop link. Dynamic selection of the quantity of MIMO layers (and antennas/transmitting and/or receiving chains) may be based at least in part on the MCS which will be used for a specific Sub-THz UE data offloading session (e.g., the MCS used between the repeater 610 and the UE 120). For example, a higher MCS (e.g., as indicated by an index associated with the MCS) may be associated with a lower quantity of MIMO layers (e.g., to reduce a possibility of cross-layer interference). As shown in FIG. 6, the dynamic indications of the quantity of MIMO layers and/or other communication parameters may be communicated via a PCell link (e.g., associated with the network node 110). For example, a repeater (e.g., the repeater 605 and/or the repeater 610) may receive an indication of one or more sets of communication parameters via a primary cell associated with the multi-hop link.

Although examples are described herein in connection with sub-THz communication, the aspects described herein may be applied to other multi-hop links that use different frequency bands or frequencies. For example, the repeater 605 and/or the repeater 610 may use a millimeter wave frequency for a first operation (e.g., a transmitting or receiving operation) and a sub-6 GHz frequency for a second operation (e.g., a receiving or transmitting operation) in a similar manner as described herein. In other words, a repeater (e.g., the repeater 605 and/or the repeater 610) may receive signals using a first frequency and may transmit signals using a second frequency. The combination of the first frequency and the second frequency may include a first sub-THz frequency and a second sub-THz frequency, a sub-THz frequency and a millimeter wave frequency, and/or a millimeter wave frequency and a sub-6 GHz frequency, among other examples. Additionally, examples are described herein in connection with a downlink operation. However, the aspects described herein may be similarly applied to an uplink operation (e.g., from the UE 120 to the network node 110) or another backhauling operation.

As shown by reference number 620, the network node 110 may transmit, and the repeater 605 may receive, one or more signals. The one or more signals may be associated with a communication (e.g., that is intended for the UE 120). The one or more signals may be associated with a first frequency band and/or a first frequency. For example, the first frequency band and/or the first frequency may be associated with a higher frequency band, such as a sub-THz band, among other examples. The one or more signals may be associated with a first one or more communication parameters that result in a data capacity for the first one or more signals. For example, the first one or more communication parameters may include a first bandwidth, a first MCS, and/or a first quantity of MIMO layers, among other examples. For example, the one or more signals may be associated with the first bandwidth and may not use MIMO (e.g., the one or more signals may use a single LOS link between the network node 110 and the repeater 605).

In some aspects, a transmit antenna and/or a receive antenna can have two ports, which can include a horizontally polarized (H) port (which also may be referred to as a "horizontal port") and a vertically polarized (V) port (which also may be referred to as a "vertical port"). Horizontal polarization and vertical polarization can refer to a horizontal direction and a vertical direction, respectively, relative to a specified coordinate system associated with the corresponding antenna. Accordingly, in cases where a transmitter (e.g., the network node 110) transmits a signal using both the H port and the V port independently and/or transmits a signal using a suitable precoder (e.g., a non-linear precoder), a receiver (e.g., the UE 120 and/or the repeater 605) can simultaneously observe two streams of the transmitted signal, which can be referred to as rank-2 communication, where a rank value generally refers to a quantity of transmission streams that are observed at a receiver. Alternatively, in cases where the transmitter uses a linear precoder (e.g., an H+V precoder or an H–V precoder), or transmits a signal using only one port (e.g., only the H port or only the V port), the receiver can observe only one stream of the transmitted signal, which can be referred to as rank-1 communication. In some cases, a receiver can be configured to always use both H and V ports for reception, to ensure optimal performance. In some aspects, the repeater 605 may receive the one or more signals from the network node 110 via a single H+V link.

As shown by reference number 625, the repeater 605 may perform one or more actions (e.g., one or more processing operations) to ensure a link capacity (e.g., a data capacity) is maintained for the multi-hop link. For example, the repeater 605 may perform an action to adjust the first one or more communication parameters to a second one or more communication parameters for transmission via a second frequency band or a second frequency. The second one or more communication parameters cause the data capacity to be maintained. For example, the second one or more communication parameters may include a second bandwidth and a second quantity of MIMO layers that result in another data capacity for a second one or more signals associated with the communication (e.g., to be transmitted by the repeater 605). "Maintaining" the data capacity may refer to a difference between the data capacity (e.g., of the one or more signals received by the repeater 605) and the other data capacity (e.g., of the one or more signals to be transmitted by the repeater 605) satisfying a threshold.

In some aspects, the second frequency band may be different than an operating frequency of any other SCells within a coverage area of the PCell associated with the network node 110 (e.g., to reduce a risk of interference). For example, the first frequency band or the second frequency band may be different than an operating frequency of another cell having an overlapping coverage area with a coverage area of at least one of a primary cell or a secondary cell associated with the multi-hop link.

As described elsewhere herein, the first frequency band (and/or the first frequency) and the second frequency band (and/or the second frequency) may be associated with different frequency bands. As another example, the first frequency band (and/or the first frequency) and the second frequency band (and/or the second frequency) may be associated with different subbands included in a frequency band. For example, the different subbands may be separated by a guard band in the frequency domain. For example, a single sub-THz band may be partitioned into two parts where the two parts are separated in the frequency domain (e.g., by a guard band). The guard band may enable the repeater 605 (and/or the repeater 610) to perform filtering (e.g., bandpass filtering) to filter out unintended frequencies included in the single sub-THz band.

In some aspects, the first frequency band may have a smaller range than the other frequency bands. For example, as described in more detail elsewhere herein, a sub-THz frequency band may be associated with a smaller range due to transmit power limitations and/or power inefficiencies, among other examples. Therefore, the second frequency band may be used for an intermediate hop (e.g., between the repeater 605 and the repeater 610) in the multi-hop link to extend a range of coverage associated with the network node 110 and/or the sub-THz frequency band. However, in some aspects, the first frequency band may be associated with a higher data capacity than the second frequency band. For example, a sub-THz link between the network node 110 and the repeater 605 may use a larger bandwidth than an available for a millimeter wave link between the repeater 605 and the repeater 610. Therefore, to maintain a data capacity of the intermediate hop, the repeater 605 and/or the repeater 610 may process the received signals and convert the received signals to use different communication parameters to maintain the data capacity across the multi-hop link. This may ensure that the intermediate hops that use different frequency bands do not cause a bottleneck for the multi-hop link (e.g., that would have otherwise been caused due to the lower data capacity of the frequency band used for the intermediate hop).

For example, the first one or more communication parameters may include the first bandwidth that is larger than a second bandwidth included in the second one or more communication parameters (e.g., the link between the network node 110 and the repeater 605 may use a larger bandwidth than a link between the repeater 605 and the repeater 610). In such examples, the one or more actions performed by the repeater 605 may include converting the first one or more signals (e.g., received by the repeater 605) into a plurality of MIMO layers (e.g., LOS MIMO layers). For example, the repeater 605 may downconvert the first one or more signals into a baseband signal. The repeater 605 may perform low-pass filtering on the baseband signal to filter the first bandwidth into a quantity of segments. The repeater 605 may upconvert the baseband signal to the second one or more signals associated with the second frequency band and to a second bandwidth. The repeater 605 may map the segments to the plurality of MIMO layers (e.g., the plurality of MIMO layers including the quantity of MIMO layers indicated by the network node 110, such as in the configuration information). The operation(s) performed by the repeater 605 are depicted and described in more detail in connection with FIGS. 7 and 8 (such as in connection with example 800).

As shown by reference number 630, the repeater 605 may transmit, and the repeater 610 may receive, a second one or more signals of the communication (e.g., one or more repeated signals) using the second one or more communication parameters (e.g., via the second frequency band and via the multi-hop link). In other words, the repeater 605 may repeat the communication received from the network node 110 using a different frequency band and using different communication parameters (e.g., using a different bandwidth, a different MCS, and/or a different quantity of MIMO layers). The link between the repeater 605 and the repeater 610 may be an intermediate hop in the multi-hop link. For example, the repeater 610 may forward (e.g., repeat) the communication to another device, such as the UE 120 (e.g., where the UE 120 is the intended recipient of the communication).

As shown by reference number 635, the repeater 610 may perform one or more actions (e.g., one or more processing operations) to ensure a link capacity (e.g., a data capacity) is maintained for the multi-hop link. For example, the repeater 610 may perform an action to adjust the second one or more communication parameters to a third one or more communication parameters for transmission via the first frequency band or the first frequency. In some aspects, the third one or more communication parameters may be, or may be similar to, the first one or more communication parameters. For example, the repeater 610 may be an AP for a sub-THz SCell that is configured for the UE 120. Therefore, the repeater 610 may perform one or more actions to ensure that a data capacity of the signal(s) received from the repeater 605 (e.g., using a lower frequency band) is the same as, or similar to, the data capacity of signal(s) transmitted to the UE 120 via the sub-THz SCell. For example, the link between the UE 120 and the repeater 610 may be a single H+V link (e.g., a single layer) and the link between the repeater 610 and the repeater 605 may include multiple H+V links (e.g., associated with multiple MIMO layers). The one or more actions (e.g., one or more processing operations) may include converting the multiple H+V links into the single H+V link.

For example, the transmitting side of the repeater 610 may be associated with a bandwidth that is larger than a bandwidth used for the receiving side of the repeater 610. In such examples, the repeater 610 may receive multiple MIMO layers from the repeater 605 (or another wireless communication device). The repeater 610 may combine the plurality of MIMO layers into a single signal having the bandwidth associated with the transmitting side of the repeater 610. For example, the repeater 610 may receive one or more signals associated with a quantity of LOS MIMO layers. The repeater 610 may upconvert the one or more signals to the higher frequency band associated with the transmitting side of the repeater 610 (e.g., the sub-THz frequency band or another frequency band). The repeater 610 may combine the LOS MIMO layers into a single link associated with the higher frequency band and the bandwidth associated with the transmitting side of the repeater 610. The operation(s) performed by the repeater 610 are depicted and described in more detail in connection with FIGS. 7 and 8 (such as in connection with example 805).

As shown by reference number 640, the repeater 610 may transmit, and the UE 120 may receive, one or more signals using the first frequency band and/or the first frequency (e.g., that was used by the network node 110 to transmit the first one or more signals to the repeater 605 as described above in connection with reference number 620). In other words, the repeater 610 may repeat the communication (e.g., received from the repeater 610 using a lower frequency band as described above in connection with reference number 630) to the UE 120 using a higher frequency band, such as a sub-THz frequency band.

As a result, the repeater(s) (e.g., the repeater 605 and/or the repeater 610) may mitigate noise or interference caused by Tx-to-Rx leakage. For example, different carrier frequencies may be used on different sides of an analog repeater (Tx and Rx) to increase Tx to Rx isolation based on frequency domain separation (e.g., in addition to analog filtering). This may enable the multi-hop link (such as the network deployment depicted in FIG. 5) to use analog repeaters. Using analog repeaters may improve a power efficiency of the repeaters (e.g., as compared to repeaters that perform digital processing). Additionally, by enabling a repeater to use different frequencies and/or different frequencies bands for a repeating operation, a transmit power (e.g., an allowed transmit power) of the repeater may be increased. This may improve a range and/or coverage area of the repeater. By increasing the range and/or coverage area of the repeater, a range and/or coverage area of a sub-THz network deployment (such as the network deployment depicted in FIG. 5) may be increased.

As indicated above, FIG. 6 is provided as an example. Other examples may differ from what is described with respect to FIG. 6.

Figure 7:
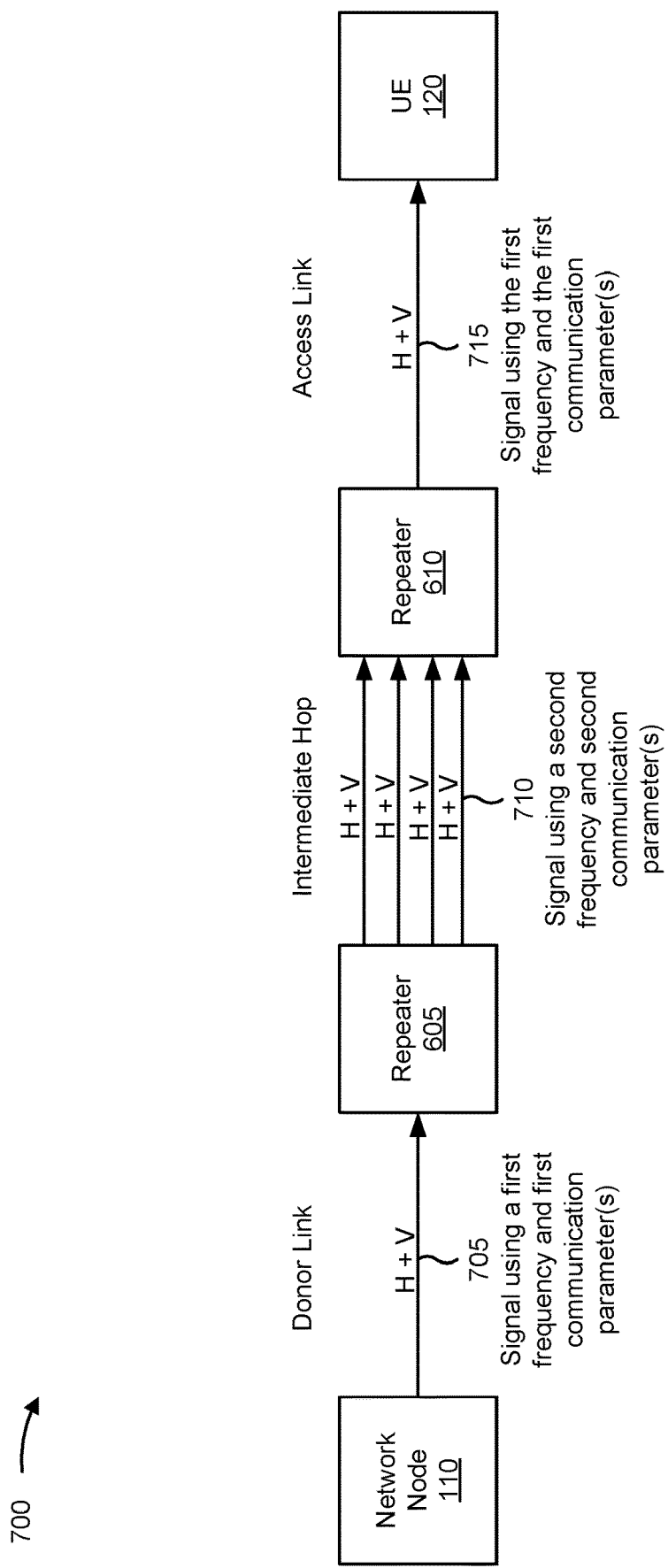

FIG. 7 is a diagram of an example 700 associated with a hybrid frequency repeater for a multi-hop link, in accordance with the present disclosure. As shown in FIG. 7, the network node 110, the repeater 605, the repeater 610, and the UE 120 may communicate via a multi-hop link. Although the example 700 depicts a downlink operation, the operations described herein may be similarly applied for an uplink operation.

For example, the network node 110 may communicate with the repeater 605 via a donor link or a backhaul link. The repeater 605 may communicate with the repeater 610 via an intermediate hop. The repeater 610 may communicate with the UE 120 via an access link. As shown by reference number 705, the network node 110 may transmit, and the repeater 605 may receive, a signal via the donor link. For example, the signal may be associated with a first frequency band (e.g., a sub-THz frequency band). The signal may be associated with a bandwidth, B. The signal may be a single signal associated with a single link (e.g., a single H+V link).

As shown by reference number 710, the repeater 605 may transmit, and the repeater 610 may receive, one or more signals over the intermediate hop. For example, the intermediate hop may be associated with a second frequency band that is lower than the first frequency band (e.g., the second frequency band may be a millimeter wave frequency band, an FR1 frequency band, an FR2 frequency band, an FR4 frequency band, or another frequency band). As shown in FIG. 7, the repeater 605 may transmit the signal(s) via multiple links and/or multiple MIMO layers. For example, the intermediate link may be associated with a smaller bandwidth as compared to the bandwidth B. Accordingly, the repeater 605 may use an increased quantity of links and/or MIMO layers (e.g., as compared to the donor link) to ensure that the intermediate link has the same, or similar, data capacity as the donor link and/or as the access link.

For example, the intermediate link may be associated with N links, each link with two layers (e.g., an H layer and a V layer), resulting in (H+V)*N total layers. In the example 700, N may be equal to four. Each link may be associated with a bandwidth of B/N. Each link may be based on a dedicated lens beamformer (e.g., N dual polarization lens beamformers can be used on each hop side for the intermediate link). Lens beamformers may allow for digital beam refinement/selection per link (e.g., for reduced inter-link interference) as a part of installation procedure and/or per Sub-THz link activation procedure (e.g., which may not be possible with parabolic antenna or another fixed beam solution). As shown by reference number 715, the repeater 610 may transmit a signal via the access link. For example, the signal may be associated with the first frequency band (e.g., a sub-THz frequency band). The signal may be associated with a bandwidth, B. The signal may be a single signal associated with a single link (e.g., a single H+V link).

By using the N links (e.g., N spatial links) over the intermediate link, an equivalent bandwidth may be achieved for the donor link, the intermediate link, and the access link. Additionally, this may reduce an overall bandwidth used for Sub-THz based traffic offloading because the total bandwidth used for all hops may be B+(B/N) (e.g., rather than 2B which may be the case if MIMO is not used for the intermediate hop). Additionally, using the second (e.g., lower) frequency band for the intermediate hop may improve a power efficiency of the multi-hop link because the higher frequency band (e.g., the sub-THz band) may be associated with a lower power efficiency than the second (e.g., lower) frequency band.

In some examples, a single repeater may be used for the multi-hop link. For example, the repeater 610 may receive the signals over the multiple links directly from the network node 110 (e.g., rather than via the repeater 605). The repeater 610 may convert the multiple links into a single sub-THz link to be transmitted to the UE 120 in a similar manner as described in more detail elsewhere herein.

As indicated above, FIG. 7 is provided as an example. Other examples may differ from what is described with respect to FIG. 7.

Figure 8:
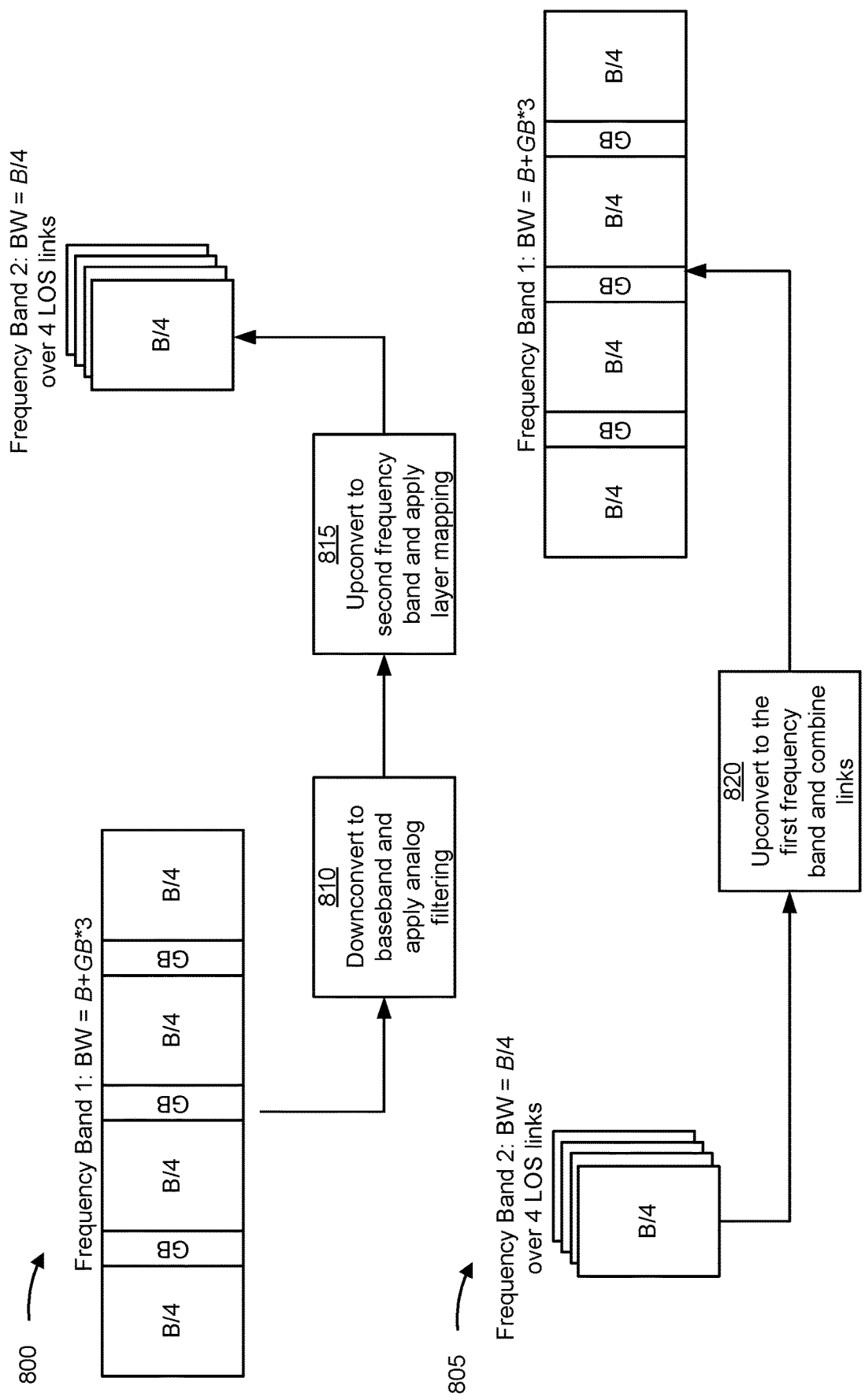

FIG. 8 is a diagram of examples 800 and 805 associated with a hybrid frequency repeater for a multi-hop link, in accordance with the present disclosure. As shown in FIG. 8, example 800 may be associated with a repeater (e.g., the repeater 605 and/or the repeater 610) converting signals from a higher frequency band to a lower frequency band for a repeating operation. Example 805 may be associated a repeater (e.g., the repeater 605 and/or the repeater 610) converting signals from a lower frequency band to a higher frequency band for a repeating operation.

As shown by the example 800, the repeater may receive a signal using a first frequency band (e.g., frequency band 1). The bandwidth of the signal may be B+GB*3, where GB is frequency resources allocated to a guard band. For example, the signal may include guard bands between portions of the bandwidth that are to be separated or partitioned for the hybrid frequency repeating operation described herein. The guard bands may enable the repeater to refrain from performing low-pass filtering (e.g., which may be associated with high processing overhead). For example, the introduction of the guard band(s) may relax one or more analog low-pass filtering requirements, such as a pass-band error vector magnitude (EVM) and/or a stop-band rejection, among other examples.

As shown by reference number 810, the repeater may downconvert the received signal to a baseband signal (e.g., for processing by a baseband processor of the repeater). In some aspects, the repeater may perform low-pass filtering on the baseband signal to filter the first bandwidth into a quantity of segments. For example, as shown in FIG. 8, the repeater may segment the received signal into N segments, where N is four in the example 800. In other words, the repeater may perform channelization to convert the received signal (e.g., associated with the first frequency band) into smaller segments for N links associated with a second frequency band. For example, each segment may be associated with a bandwidth of (B+GB*3)/N.

As shown by reference number 815, the repeater may upconvert the segmented signal to the second frequency band (e.g., from a baseband signal). The repeater may perform layer mapping to map each segment to a respective link or MIMO layer. For example, the repeater may perform interconnection or distribution of the segments to respective LOS MIMO links. As shown in FIG. 8, the signal(s) over the NMIMO links may be associated with a bandwidth of B/N (e.g., B/4 in the example 800 where N is four). The repeater may transmit the signal(s) via the NMIMO links using the second frequency band.

In the example 805, the repeater may receive one or more signals via NMIMO links (e.g., using the second frequency band). The NMIMO links may be associated with a bandwidth of B/N (e.g., B/4 in the example 805 where N is four). As shown by reference number 820, the repeater may upconvert the received signal(s) to the first frequency band. The repeater may combine the signals received via the NMIMO links into a single signal (e.g., for a single link). For example, the repeater may aggregate the NMIMO links or layers into a single link associated with the first frequency band to obtain a combined bandwidth of B+GB*3. The repeater may transmit the combined or aggregated signal using a single link and using the first frequency band.

The operations described herein may enable the repeater to avoid performing digital processing operations which may consume processing resources and/or power resources associated with a repeating operation. For example, in some cases, precoding may be applied by a transmitter (e.g., a network node 110 or a UE 120) and Minimum mean square error (MMSE) combining may be performed by a receiver (e.g., a network node 110 or a UE 120) at the ends of the multi-hop link to enable the repeaters to avoid performing digital processing operations.

As indicated above, FIG. 8 is provided as an example. Other examples may differ from what is described with regard to FIG. 8.

FIG. 9 is a diagram illustrating an example process 900 performed, for example, by a repeater, in accordance with the present disclosure. Example process 900 is an example where the repeater (e.g., the repeater 605 or the repeater 610) performs operations associated with a hybrid frequency repeater for a multiple hop link.

As shown in FIG. 9, in some aspects, process 900 may include receiving, via a first frequency band, a first one or more signals of a communication that is associated with a multiple hop link, wherein the first one or more signals are associated with a first one or more communication parameters that result in a data capacity for the first one or more signals (block 910). For example, the repeater (e.g., using communication manager 140 and/or reception component 1002, depicted in FIG. 10) may receive, via a first frequency band, a first one or more signals of a communication that is associated with a multiple hop link, wherein the first one or more signals are associated with a first one or more communication parameters that result in a data capacity for the first one or more signals, as described above.

As further shown in FIG. 9, in some aspects, process 900 may include performing an action to adjust the first one or more communication parameters to a second one or more communication parameters for transmission via a second frequency band, wherein the second one or more communication parameters cause the data capacity to be maintained (block 920). For example, the repeater (e.g., using communication manager 140 and/or performing component 1008, depicted in FIG. 10) may perform an action to adjust the first one or more communication parameters to a second one or more communication parameters for transmission via a second frequency band, wherein the second one or more communication parameters cause the data capacity to be maintained, as described above.

As further shown in FIG. 9, in some aspects, process 900 may include transmitting, via the second frequency band and via the multiple hop link, a second one or more signals of the communication using the second one or more communication parameters (block 930). For example, the repeater (e.g., using communication manager 140 and/or transmission component 1004, depicted in FIG. 10) may transmit, via the second frequency band and via the multiple hop link, a second one or more signals of the communication using the second one or more communication parameters, as described above.

Process 900 may include additional aspects, such as any single aspect or any combination of aspects described below and/or in connection with one or more other processes described elsewhere herein.

In a first aspect, the first frequency band and the second frequency band are at least one of different frequency bands, or subbands included in a frequency band that are separated by a guard band.

In a second aspect, alone or in combination with the first aspect, the first one or more communication parameters include a first bandwidth and a first quantity of MIMO layers that result in the data capacity for the first one or more signals, the second one or more communication parameters include a second bandwidth and a second quantity of MIMO layers that result in another data capacity for the second one or more signals, and a difference between the data capacity and the other data capacity satisfies a threshold.

In a third aspect, alone or in combination with one or more of the first and second aspects, the first one or more communication parameters include a first bandwidth that is larger than a second bandwidth included in the second one or more communication parameters, and performing the action includes converting the first one or more signals into a plurality of MIMO layers.

In a fourth aspect, alone or in combination with one or more of the first through third aspects, the first one or more communication parameters include a first bandwidth that is smaller than a second bandwidth included in the second one or more communication parameters and a plurality of MIMO layers, and performing the action includes combining the plurality of MIMO layers into a single signal having the second bandwidth.

In a fifth aspect, alone or in combination with one or more of the first through fourth aspects, a first transmission, from the first one or more signals or the second one or more signals, is associated with a LOS MIMO communication, and a second transmission, from the first one or more signals or the second one or more signals, is associated with a single link.

In a sixth aspect, alone or in combination with one or more of the first through fifth aspects, the first frequency band or the second frequency band is different than an operating frequency of another cell having an overlapping coverage area with a coverage area of at least one of a primary cell or a secondary cell associated with the multiple hop link.

In a seventh aspect, alone or in combination with one or more of the first through sixth aspects, process 900 includes receiving, from a network node, an indication of at least one of the first one or more communication parameters or the second one or more communication parameters.

In an eighth aspect, alone or in combination with one or more of the first through seventh aspects, receiving the indication of at least one of the first one or more communication parameters or the second one or more communication parameters includes receiving a dynamic indication activating a quantity of LOS MIMO layers for the first one or more signals or the second one or more signals.

In a ninth aspect, alone or in combination with one or more of the first through eighth aspects, receiving the indication of at least one of the first one or more communication parameters or the second one or more communication parameters includes receiving the indication via a primary cell associated with the multiple hop link.

In a tenth aspect, alone or in combination with one or more of the first through ninth aspects, at least one of the first one or more communication parameters or the second one or more communication parameters is based at least in part on a modulation and coding scheme associated with the multiple hop link.

In an eleventh aspect, alone or in combination with one or more of the first through tenth aspects, the first one or more communication parameters and the second one or more communication parameters include respective parameters including at least one of a bandwidth, a quantity of MIMO layers, or a modulation and coding scheme.

In a twelfth aspect, alone or in combination with one or more of the first through eleventh aspects, the first one or more signals include a single signal associated with a first bandwidth, and performing the action includes downconverting the single signal to a baseband signal, performing low-pass filtering on the baseband signal to filter the first bandwidth into a quantity of segments, upconverting the baseband signal to the second one or more signals associated with the second frequency band and to a second bandwidth, and mapping the segments to a plurality of MIMO layers, wherein the plurality of MIMO layers includes the quantity of MIMO layers.

In a thirteenth aspect, alone or in combination with one or more of the first through twelfth aspects, the first one or more signals include a quantity of LOS MIMO layers associated with a first bandwidth, and performing the action includes upconverting the first one or more signals to the second frequency band and to a second bandwidth, and combining the LOS MIMO layers into a single link associated with the second frequency band and the second bandwidth.

In a fourteenth aspect, alone or in combination with one or more of the first through thirteenth aspects, receiving the first one or more signals includes receiving the first one or more signals from a network node or a user equipment, and transmitting the second one or more signals includes transmitting the second one or more signals to another repeater.

In a fifteenth aspect, alone or in combination with one or more of the first through fourteenth aspects, receiving the first one or more signals includes receiving the first one or more signals from another repeater, and transmitting the second one or more signals includes transmitting the second one or more signals to a network node or a user equipment.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
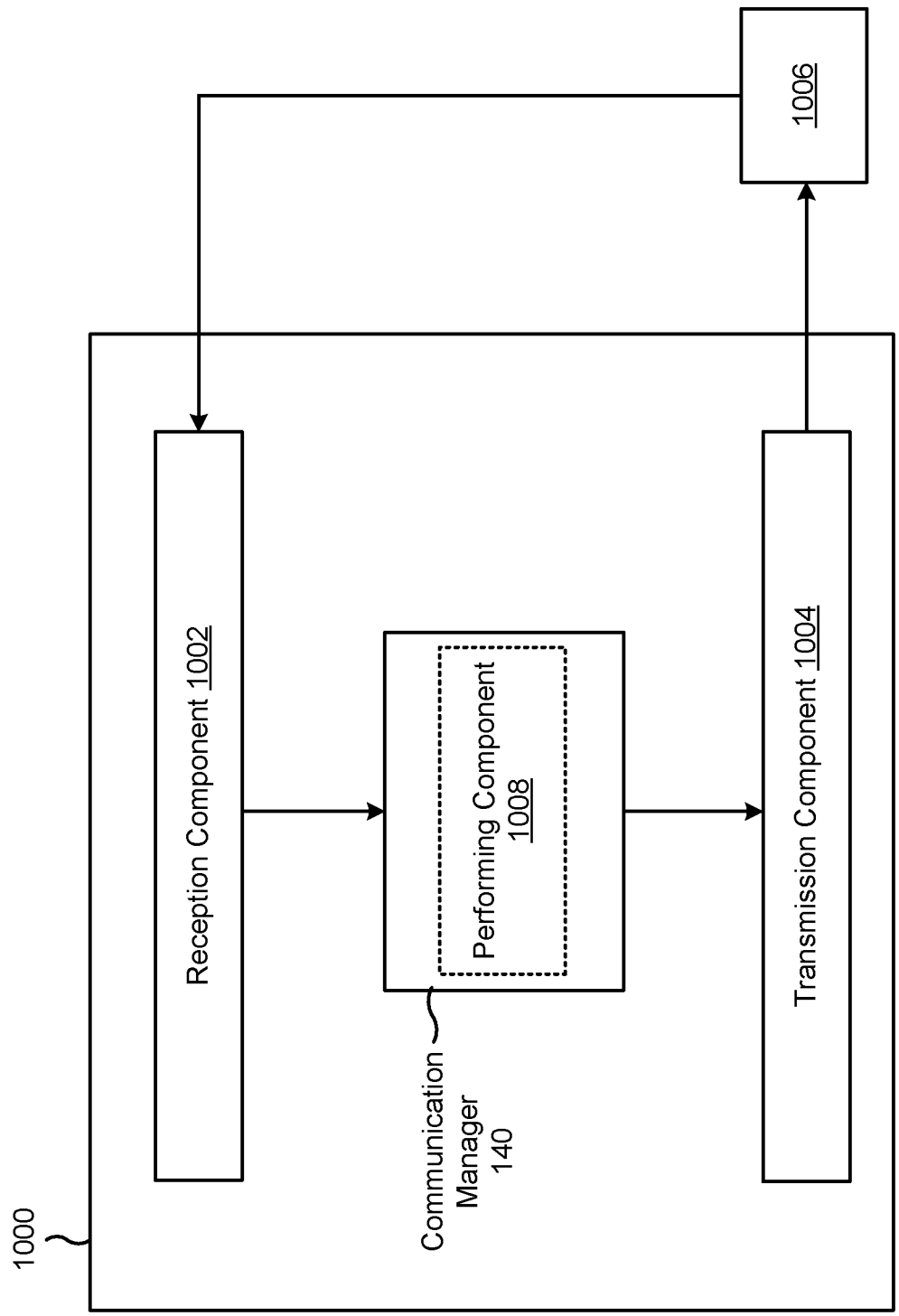
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a repeater, or a repeater may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a performing component 1008, among other examples.

In some aspects, the apparatus 1000 may be configured to perform one or more operations described herein in connection with FIGS. 6-8. Additionally, or alternatively, the apparatus 1000 may be configured to perform one or more processes described herein, such as process 900 of FIG. 9, or a combination thereof. In some aspects, the apparatus 1000 and/or one or more components shown in FIG. 10 may include one or more components of the repeater described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the repeater described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the repeater described in connection with FIG. 2. In some aspects, the transmission component 1004 may be co-located with the reception component 1002 in a transceiver.

The reception component 1002 may receive, via a first frequency band, a first one or more signals of a communication that is associated with a multiple hop link, wherein the first one or more signals are associated with a first one or more communication parameters that result in a data capacity for the first one or more signals. The performing component 1008 may perform an action to adjust the first one or more communication parameters to a second one or more communication parameters for transmission via a second frequency band, wherein the second one or more communication parameters cause the data capacity to be maintained. The transmission component 1004 may transmit, via the second frequency band and via the multiple hop link, a second one or more signals of the communication using the second one or more communication parameters.

The reception component 1002 may receive, from a network node, an indication of at least one of the first one or more communication parameters or the second one or more communication parameters.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a repeater, comprising: receiving, via a first frequency band, a first one or more signals of a communication that is associated with a multiple hop link, wherein the first one or more signals are associated with a first one or more communication parameters that result in a data capacity for the first one or more signals; performing an action to adjust the first one or more communication parameters to a second one or more communication parameters for transmission via a second frequency band, wherein the second one or more communication parameters cause the data capacity to be maintained; and transmitting, via the second frequency band and via the multiple hop link, a second one or more signals of the communication using the second one or more communication parameters.

Aspect 2: The method of Aspect 1, wherein the first frequency band and the second frequency band are at least one of: different frequency bands, or subbands included in a frequency band that are separated by a guard band.

Aspect 3: The method of any of Aspects 1-2, wherein the first one or more communication parameters include a first bandwidth and a first quantity of multiple input multiple output (MIMO) layers that result in the data capacity for the first one or more signals; wherein the second one or more communication parameters include a second bandwidth and a second quantity of MIMO layers that result in another data capacity for the second one or more signals; and wherein a difference between the data capacity and the other data capacity satisfies a threshold.

Aspect 4: The method of any of Aspects 1-3, wherein the first one or more communication parameters include a first bandwidth that is larger than a second bandwidth included in the second one or more communication parameters, and wherein performing the action comprises: converting the first one or more signals into a plurality of multiple input multiple output (MIMO) layers.

Aspect 5: The method of any of Aspects 1-3, wherein the first one or more communication parameters include a first bandwidth that is smaller than a second bandwidth included in the second one or more communication parameters and a plurality of multiple input multiple output (MIMO) layers, and wherein performing the action comprises: combining the plurality of MIMO layers into a single signal having the second bandwidth.

Aspect 6: The method of any of Aspects 1-5, wherein a first transmission, from the first one or more signals or the second one or more signals, is associated with a line of sight (LOS) multiple input multiple output (MIMO) communication, and wherein a second transmission, from the first one or more signals or the second one or more signals, is associated with a single link.

Aspect 7: The method of any of Aspects 1-6, wherein the first frequency band or the second frequency band is different than an operating frequency of another cell having an overlapping coverage area with a coverage area of at least one of a primary cell or a secondary cell associated with the multiple hop link.

Aspect 8: The method of any of Aspects 1-7, further comprising: receiving, from a network node, an indication of at least one of the first one or more communication parameters or the second one or more communication parameters.

Aspect 9: The method of Aspect 8, wherein receiving the indication of at least one of the first one or more communication parameters or the second one or more communication parameters comprises: receiving a dynamic indication activating a quantity of line of sight (LOS) multiple input multiple output (MIMO) layers for the first one or more signals or the second one or more signals.

Aspect 10: The method of any of Aspects 8-9, wherein receiving the indication of at least one of the first one or more communication parameters or the second one or more communication parameters comprises: receiving the indication via a primary cell associated with the multiple hop link.

Aspect 11: The method of any of Aspects 1-10, wherein at least one of the first one or more communication parameters or the second one or more communication parameters is based at least in part on a modulation and coding scheme associated with the multiple hop link.

Aspect 12: The method of any of Aspects 1-11, wherein the first one or more communication parameters and the second one or more communication parameters include respective parameters including at least one of: a bandwidth, a quantity of multiple input multiple output (MIMO) layers, or a modulation and coding scheme.

Aspect 13: The method of any of Aspects 1-12, wherein the first one or more signals include a single signal associated with a first bandwidth, and wherein performing the action comprises: downconverting the single signal to a baseband signal; performing low-pass filtering on the baseband signal to filter the first bandwidth into a quantity of segments; upconverting the baseband signal to the second one or more signals associated with the second frequency band and to a second bandwidth; and mapping the segments to a plurality of multiple input multiple output (MIMO) layers, wherein the plurality of MIMO layers includes the quantity of MIMO layers.

Aspect 14: The method of any of Aspects 1-13, wherein the first one or more signals include a quantity of line of sight (LOS) multiple input multiple output (MIMO) layers associated with a first bandwidth, and wherein performing the action comprises: upconverting the first one or more signals to the second frequency band and to a second bandwidth; and combining the LOS MIMO layers into a single link associated with the second frequency band and the second bandwidth.

Aspect 15: The method of any of Aspects 1-14, wherein receiving the first one or more signals comprises: receiving the first one or more signals from a network node or a user equipment; and wherein transmitting the second one or more signals comprises: transmitting the second one or more signals to another repeater.

Aspect 16: The method of any of Aspects 1-14, wherein receiving the first one or more signals comprises: receiving the first one or more signals from another repeater; and wherein transmitting the second one or more signals comprises: transmitting the second one or more signals to a network node or a user equipment.

Aspect 17: An apparatus for wireless communication at a device, comprising a processor; memory coupled with the processor; and instructions stored in the memory and executable by the processor to cause the apparatus to perform the method of one or more of Aspects 1-16.

Aspect 18: A device for wireless communication, comprising a memory and one or more processors coupled to the memory, the one or more processors configured to perform the method of one or more of Aspects 1-16.

Aspect 19: An apparatus for wireless communication, comprising at least one means for performing the method of one or more of Aspects 1-16.

Aspect 20: A non-transitory computer-readable medium storing code for wireless communication, the code comprising instructions executable by a processor to perform the method of one or more of Aspects 1-16.

Aspect 21: A non-transitory computer-readable medium storing a set of instructions for wireless communication, the set of instructions comprising one or more instructions that, when executed by one or more processors of a device, cause the device to perform the method of one or more of Aspects 1-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A repeater for wireless communication, comprising:
a memory; and
one or more processors, coupled to the memory, configured to:
receive, via a first frequency band, a first one or more signals of a communication that is associated with a multiple hop link, wherein the first one or more signals are associated with a first one or more communication parameters that result in a data capacity for the first one or more signals;
perform an action to adjust the first one or more communication parameters to a second one or more communication parameters for transmission via a second frequency band, wherein the second one or more communication parameters cause the data capacity to be maintained; and
transmit, via the second frequency band and via the multiple hop link, a second one or more signals of the communication using the second one or more communication parameters.

2. The repeater of claim 1, wherein the first frequency band and the second frequency band are at least one of:
different frequency bands, or
subbands included in a frequency band that are separated by a guard band.

3. The repeater of claim 1, wherein the first one or more communication parameters include a first bandwidth and a first quantity of multiple input multiple output (MIMO) layers that result in the data capacity for the first one or more signals;
wherein the second one or more communication parameters include a second bandwidth and a second quantity of MIMO layers that result in another data capacity for the second one or more signals; and
wherein a difference between the data capacity and the other data capacity satisfies a threshold.

4. The repeater of claim 1, wherein the first one or more communication parameters include a first bandwidth that is larger than a second bandwidth included in the second one or more communication parameters, and wherein the one or more processors, to perform the action, are configured to:
  convert the first one or more signals into a plurality of multiple input multiple output (MIMO) layers.

5. The repeater of claim 1, wherein the first one or more communication parameters include a first bandwidth that is smaller than a second bandwidth included in the second one or more communication parameters and a plurality of multiple input multiple output (MIMO) layers, and wherein the one or more processors, to perform the action, are configured to:
  combine the plurality of MIMO layers into a single signal having the second bandwidth.

6. The repeater of claim 1, wherein a first transmission, from the first one or more signals or the second one or more signals, is associated with a line of sight (LOS) multiple input multiple output (MIMO) communication, and
  wherein a second transmission, from the first one or more signals or the second one or more signals, is associated with a single link.

7. The repeater of claim 1, wherein the first frequency band or the second frequency band is different than an operating frequency of another cell having an overlapping coverage area with a coverage area of at least one of a primary cell or a secondary cell associated with the multiple hop link.

8. The repeater of claim 1, wherein the one or more processors are further configured to:
  receive, from a network node, an indication of at least one of the first one or more communication parameters or the second one or more communication parameters.

9. The repeater of claim 8, wherein the one or more processors, to receive the indication of at least one of the first one or more communication parameters or the second one or more communication parameters, are configured to:
  receive a dynamic indication activating a quantity of line of sight (LOS) multiple input multiple output (MIMO) layers for the first one or more signals or the second one or more signals.

10. The repeater of claim 8, wherein the one or more processors, to receive the indication of at least one of the first one or more communication parameters or the second one or more communication parameters, are configured to:
  receive the indication via a primary cell associated with the multiple hop link.

11. The repeater of claim 1, wherein at least one of the first one or more communication parameters or the second one or more communication parameters is based at least in part on a modulation and coding scheme associated with the multiple hop link.

12. The repeater of claim 1, wherein the first one or more communication parameters and the second one or more communication parameters include respective parameters including at least one of:
  a bandwidth,
  a quantity of multiple input multiple output (MIMO) layers, or
  a modulation and coding scheme.

13. The repeater of claim 1, wherein the first one or more signals include a single signal associated with a first bandwidth, and wherein the one or more processors, to perform the action, are configured to:
  downconvert the single signal to a baseband signal;
  perform low-pass filtering on the baseband signal to filter the first bandwidth into a quantity of segments;
  upconvert the baseband signal to the second one or more signals associated with the second frequency band and to a second bandwidth; and
  map the segments to a plurality of multiple input multiple output (MIMO) layers.

14. The repeater of claim 1, wherein the first one or more signals include a quantity of line of sight (LOS) multiple input multiple output (MIMO) layers associated with a first bandwidth, and wherein the one or more processors, to perform the action, are configured to:
  upconvert the first one or more signals to the second frequency band and to a second bandwidth; and
  combine the LOS MIMO layers into a single link associated with the second frequency band and the second bandwidth.

15. A method of wireless communication performed by a repeater, comprising:
  receiving, via a first frequency band, a first one or more signals of a communication that is associated with a multiple hop link, wherein the first one or more signals are associated with a first one or more communication parameters that result in a data capacity for the first one or more signals;
  performing an action to adjust the first one or more communication parameters to a second one or more communication parameters for transmission via a second frequency band, wherein the second one or more communication parameters cause the data capacity to be maintained; and
  transmitting, via the second frequency band and via the multiple hop link, a second one or more signals of the communication using the second one or more communication parameters.

16. The method of claim 15, wherein the first frequency band and the second frequency band are at least one of:
  different frequency bands, or
  subbands included in a frequency band that are separated by a guard band.

17. The method of claim 15, wherein the first one or more communication parameters include a first bandwidth and a first quantity of multiple input multiple output (MIMO) layers that result in the data capacity for the first one or more signals;
  wherein the second one or more communication parameters include a second bandwidth and a second quantity of MIMO layers that result in another data capacity for the second one or more signals; and
  wherein a difference between the data capacity and the other data capacity satisfies a threshold.

18. The method of claim 15, wherein the first one or more communication parameters include a first bandwidth that is larger than a second bandwidth included in the second one or more communication parameters, and wherein performing the action comprises:
  converting the first one or more signals into a plurality of multiple input multiple output (MIMO) layers.

19. The method of claim 15, wherein the first one or more communication parameters include a first bandwidth that is smaller than a second bandwidth included in the second one or more communication parameters and a plurality of multiple input multiple output (MIMO) layers, and wherein performing the action comprises:
  combining the plurality of MIMO layers into a single signal having the second bandwidth.

20. The method of claim 15, wherein a first transmission, from the first one or more signals or the second one or more signals, is associated with a line of sight (LOS) multiple input multiple output (MIMO) communication, and
wherein a second transmission, from the first one or more signals or the second one or more signals, is associated with a single link.

21. The method of claim 15, wherein the first frequency band or the second frequency band is different than an operating frequency of another cell having an overlapping coverage area with a coverage area of at least one of a primary cell or a secondary cell associated with the multiple hop link.

22. The method of claim 15, further comprising:
receiving, from a network node, an indication of at least one of the first one or more communication parameters or the second one or more communication parameters.

23. The method of claim 22, wherein receiving the indication of at least one of the first one or more communication parameters or the second one or more communication parameters comprises:
receiving a dynamic indication activating a quantity of line of sight (LOS) multiple input multiple output (MIMO) layers for the first one or more signals or the second one or more signals.

24. The method of claim 22, wherein receiving the indication of at least one of the first one or more communication parameters or the second one or more communication parameters comprises:
receiving the indication via a primary cell associated with the multiple hop link.

25. The method of claim 15, wherein at least one of the first one or more communication parameters or the second one or more communication parameters is based at least in part on a modulation and coding scheme associated with the multiple hop link.

26. The method of claim 15, wherein the first one or more communication parameters and the second one or more communication parameters include respective parameters including at least one of:
a bandwidth,
a quantity of multiple input multiple output (MIMO) layers, or
a modulation and coding scheme.

27. The method of claim 15, wherein the first one or more signals include a single signal associated with a first bandwidth, and wherein performing the action comprises:
downconverting the single signal to a baseband signal;
performing low-pass filtering on the baseband signal to filter the first bandwidth into a quantity of segments;
upconverting the baseband signal to the second one or more signals associated with the second frequency band and to a second bandwidth; and
mapping the segments to a plurality of multiple input multiple output (MIMO) layers.

28. The method of claim 15, wherein the first one or more signals include a quantity of line of sight (LOS) multiple input multiple output (MIMO) layers associated with a first bandwidth, and wherein performing the action comprises:
upconverting the first one or more signals to the second frequency band and to a second bandwidth; and
combining the LOS MIMO layers into a single link associated with the second frequency band and the second bandwidth.

29. A non-transitory computer-readable medium storing a set of instructions for wireless communication, the set of instructions comprising:
one or more instructions that, when executed by one or more processors of a repeater, cause the repeater to:
receive, via a first frequency band, a first one or more signals of a communication that is associated with a multiple hop link, wherein the first one or more signals are associated with a first one or more communication parameters that result in a data capacity for the first one or more signals;
perform an action to adjust the first one or more communication parameters to a second one or more communication parameters for transmission via a second frequency band, wherein the second one or more communication parameters cause the data capacity to be maintained; and
transmit, via the second frequency band and via the multiple hop link, a second one or more signals of the communication using the second one or more communication parameters.

30. An apparatus for wireless communication, comprising:
means for receiving, via a first frequency band, a first one or more signals of a communication that is associated with a multiple hop link, wherein the first one or more signals are associated with a first one or more communication parameters that result in a data capacity for the first one or more signals;
means for performing an action to adjust the first one or more communication parameters to a second one or more communication parameters for transmission via a second frequency band, wherein the second one or more communication parameters cause the data capacity to be maintained; and
means for transmitting, via the second frequency band and via the multiple hop link, a second one or more signals of the communication using the second one or more communication parameters.

* * * * *